United States Patent
Baumgartner et al.

(10) Patent No.: US 6,179,378 B1
(45) Date of Patent: Jan. 30, 2001

(54) MAT WITH A HEATING WIRE FOR A MOTOR VEHICLE SEAT HEATER, AND MOTOR VEHICLE SEAT WITH SUCH A MAT

(75) Inventors: Joachim Baumgartner, Wenzenbach; Peter Popp, Regensburg; Günter Heitzer, Pfatter, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/444,965

(22) Filed: Nov. 22, 1999

Related U.S. Application Data

(63) Continuation of application No. PCT/DE98/01395, filed on May 20, 1998.

(30) Foreign Application Priority Data

May 21, 1997 (DE) .............................. 297 08 959

(51) Int. Cl.⁷ ...................................... A47C 7/72
(52) U.S. Cl. ................... 297/180.12; 297/217.3; 280/735
(58) Field of Search ............................ 297/180.1, 180.12, 297/217.3; 280/735

(56) References Cited

U.S. PATENT DOCUMENTS

| | | | |
|---|---|---|---|
| 4,865,379 | * 9/1989 | Aoki et al. | 297/180.12 |
| 4,964,674 | * 10/1990 | Altmann et al. | 297/180.12 |
| 5,002,335 | * 3/1991 | Bengtsson | 297/180.12 |
| 5,446,391 | * 8/1995 | Aoki et al. | 324/661 |
| 5,515,933 | 5/1996 | Meyer et al. . | |
| 5,618,056 | 4/1997 | Schoos et al. . | |

FOREIGN PATENT DOCUMENTS

| | | |
|---|---|---|
| 4228624A1 | 3/1994 | (DE) . |
| 4338285A1 | 5/1995 | (DE) . |
| 4401819A1 | 7/1995 | (DE) . |
| 4409971A1 | 9/1995 | (DE) . |
| 195 18 410A1 | 11/1996 | (DE) . |
| 296 19 668 U1 | 2/1997 | (DE) . |
| 0728636A1 | 8/1996 | (EP) . |
| 07164943 | 6/1995 | (JP) . |

OTHER PUBLICATIONS

"Combined Tag Antenna For Rearward Facing Infant Seat And Occupant Detection Sensor", XP 000553623, Research Disclosure, No. 382, dated Feb. 1996, GB.

\* cited by examiner

Primary Examiner—Anthony D. Barfield
(74) Attorney, Agent, or Firm—Herbert L. Lerner; Laurence A. Greenberg; Werner H. Stemer

(57) ABSTRACT

A mat incorporating a heating wire and intended for installation in a motor vehicle seat for heating the motor vehicle seat. The novel mat includes further antennas or antenna components of an antenna system, which cooperates with a resonator/transponder of a child seat. The mat thus forms a part of a system for detecting the presence of a child seat placed on the motor vehicle seat.

12 Claims, 2 Drawing Sheets

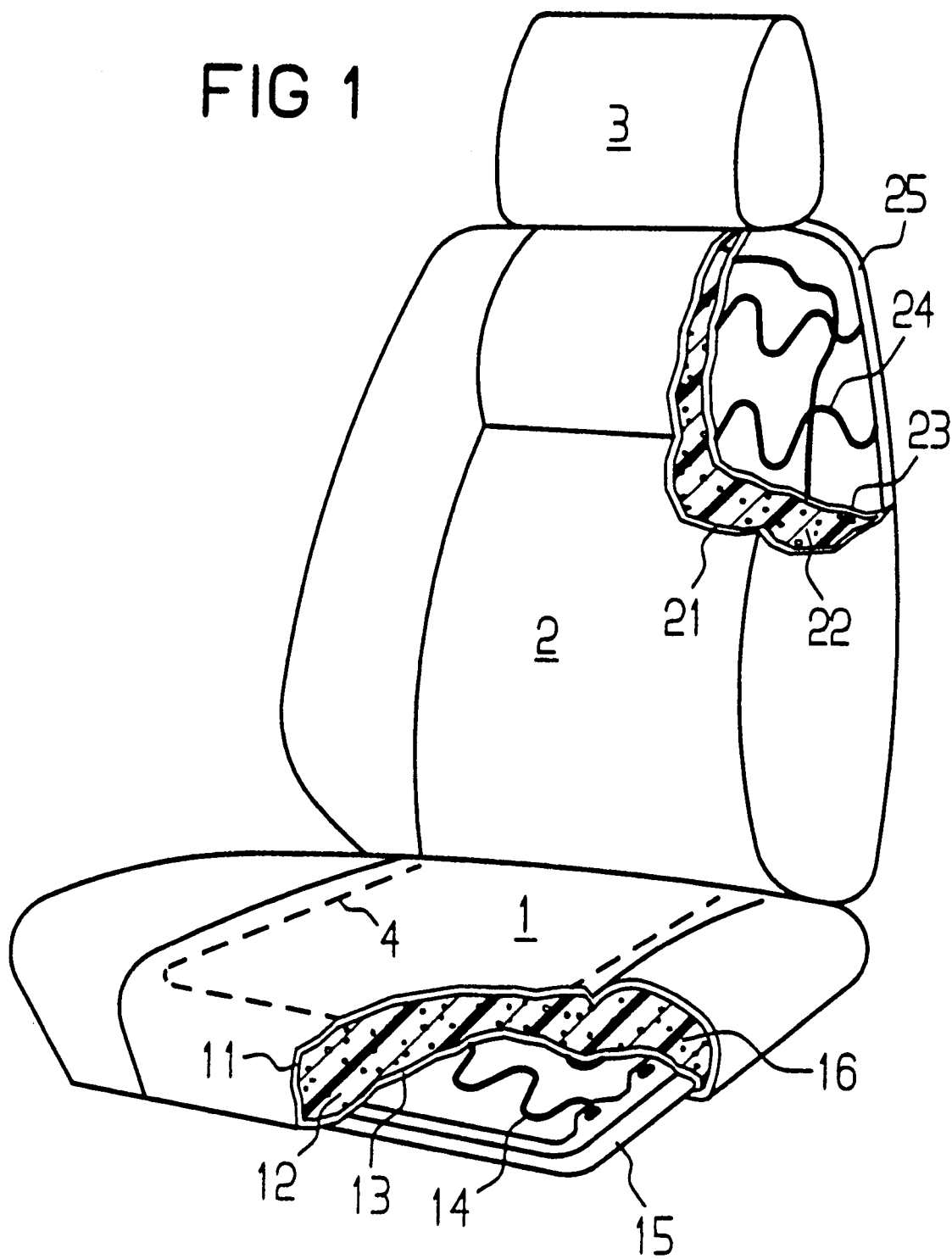

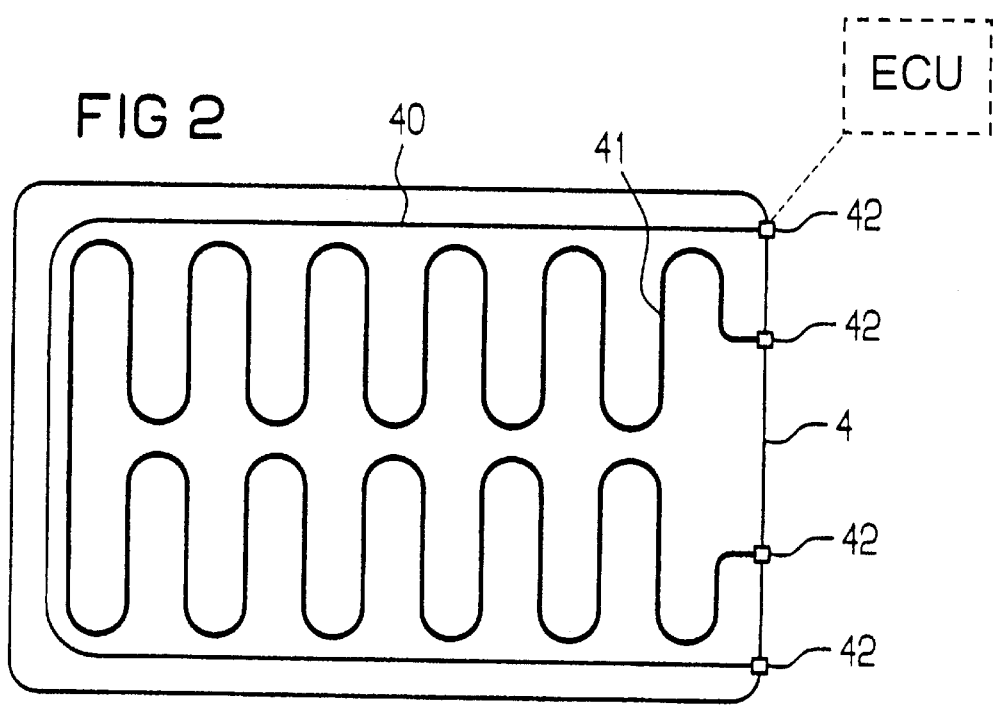
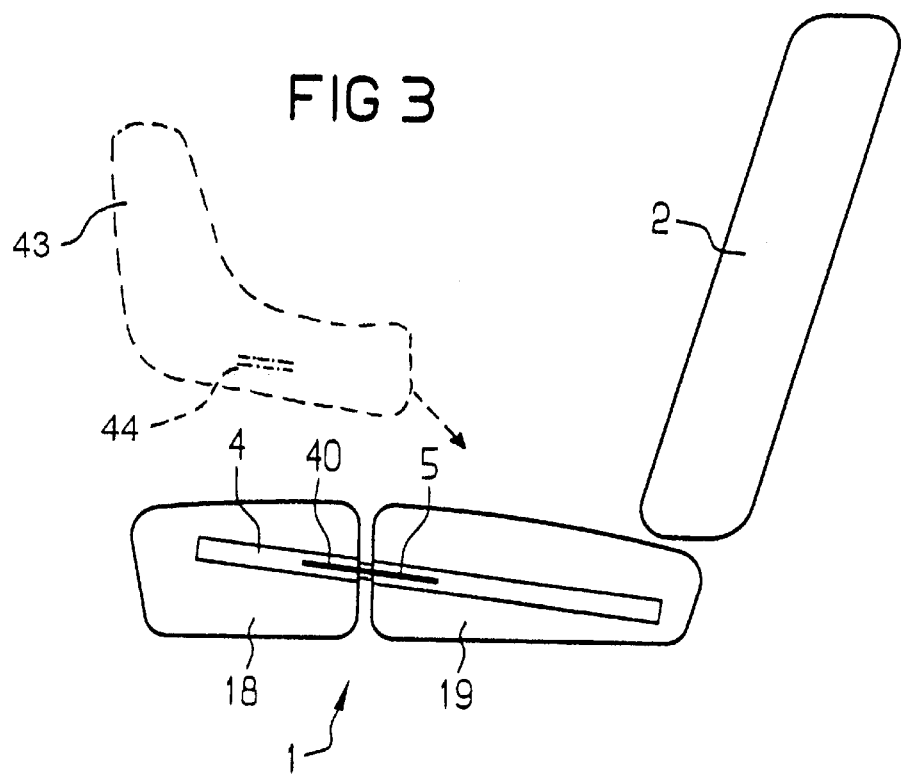

MAT WITH A HEATING WIRE FOR A MOTOR VEHICLE SEAT HEATER, AND MOTOR VEHICLE SEAT WITH SUCH A MAT

CROSS-REFERENCE TO RELATED APPLICATION

This is a continuation of copending International Application PCT/DE98/01395, filed May 20, 1998, which designated the United States.

BACKGROUND OF THE INVENTION

Field of the Invention

The invention lies in the automotive technology field. More specifically, the invention relates to a mat with a heating wire for a motor vehicle seat heater and to a motor vehicle seat having such a mat.

The automotive art has long known heated seats. For heating such motor vehicle seats, it is possible to place mats in the seat which are provided with heating wires for heating the motor vehicle seat when the mat is installed in the seat.

The automotive art has also long known air bags used as passenger protection and restraint systems in motor vehicles.

When a child is present in a child seat placed on the front passenger seat, there exists a danger posed by the possible inflation of the passenger-side air bag. This is particularly prevalent when the child seat faces rearwardly, i.e., when the backrest of the child seat faces the dashboard. Devices for detecting a child seat placed in the passenger seat provide some remedy. Such a child seat can in particular be detected in contactless fashion, as follows: A transmitting antenna provided in the vehicle outputs an electromagnetic signal. A child seat placed on the passenger seat includes a resonator/transponder, which receives the signal output by the transmitting antenna, modifies it in a characteristic way, and outputs the modified signal. A receiving antenna provided in the vehicle receives the signal transmitted by the resonator. If the received signal has a signal structure that indicates the presence of a resonator and thus of a child seat in the area of the passenger seat, then tripping of the associated air bag restraint or restraints is subsequently prevented.

U.S. Pat. No. 5,515,933 (published German patent application DE 44 09 971 A1) describes a detection system which has a plastic film with incorporated resistor elements for weight detection and an antenna for child seat detection.

A disadvantage of the prior art antenna configuration is that in every case, a complicated film carrier including a weight sensor must be produced for mounting the antennas and has to be incorporated into the motor vehicle seat.

SUMMARY OF THE INVENTION

It is accordingly an object of the invention to provide a novel mat for a passenger seat, which overcomes the above-mentioned disadvantages of the heretofore-known devices and methods of this general type and which provides for a different way of mounting the antenna for child seat detection that is advantageous with regard to production cost and effort.

With the foregoing and other objects in view there is provided, in accordance with the invention, a mat for installation in a motor vehicle seat, comprising:

a mat body adapted to be mounted in or on the motor vehicle seat;

a heating wire for a motor vehicle seat heater integrated in the mat body; and at least one antenna for transmitting or receiving electromagnetic signals integrated in the mat body.

In accordance with an added feature of the invention, the antenna is adapted to cooperate with a resonator or transponder of a child seat to be placed on the motor vehicle seat.

In accordance with an additional feature of the invention, a contact device is formed on the mat body and electrically connected to the antenna, for connecting the antenna to an electric control unit.

In accordance with another feature of the invention, the mat is formed of textile fabric.

With the above and other objects in view there is also provided, in accordance with the invention, a motor vehicle seat, comprising a seat part, a backrest connected to the seat part, a mat mounted in or on the seat part and/or the backrest, and at least one antenna in the mat for transmitting or receiving electromagnetic signals.

In a preferred embodiment of the invention, the mat is disposed in the seat part.

In accordance with again an added feature of the invention, the seat is formed with a cushion and a cushion covering, and the mat is disposed between the cushion and the cushion covering of the seat part and/or the backrest.

In accordance with again an additional feature of the invention, the seat is formed with a cushion and a cushion lining, and the mat is disposed between the cushion lining and the cushion.

In accordance with again another feature of the invention, the seat part has a thigh support, and the mat is disposed in the thigh support.

In accordance with a preferred embodiment of the invention, the seat part includes a base part and a thigh support disposed forward of the base part (in the forward-facing drive direction of the motor vehicle), the mat is integrated in the base part and in the thigh support, and wherein the antenna in the base part and the antenna in the thigh support are electrically interconnected and form an effective antenna area for an electromagnetic coupling.

In accordance with a concomitant feature of the invention, a contact device interconnects the antenna of the mat and the antenna of the base part.

In summary, the above objects are satisfied with the invention, in which the antenna is integrated with the mat that carries the seat heating wire, and the antenna is embodied separately from the seat heating wire.

Given the increasing number of motor vehicles equipped with seat heaters, it entails no further effort or expense to include the antenna of the child seat detection system in the mat that carries a seat heating wire. No additional mat for the antennas in the motor vehicle seat is needed. The antenna can be incorporated into the mat together with the seat heating wire in a single operation.

Other features which are considered as characteristic for the invention are set forth in the appended claims.

Although the invention is illustrated and described herein as embodied in a mat with a heating wire for a motor vehicle seat heater, and motor vehicle seat with such a mat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partly broken-away, perspective view of a motor vehicle seat;

FIG. 2 is a plan view of a mat according to the invention; and

FIG. 3 is a diagrammatic sectional view through a motor vehicle seat.

DESCRIPTION OF THE PREFERRED EMBODIMENTS

Referring now to the figures of the drawing in detail and first, particularly, to FIG. 1 thereof, there is seen a motor vehicle seat with a seat part 1, a backrest 2, and a headrest 3. The seat part 1 and backrest 2 structurally have approximately the same design. The seat part 1 has a seat frame 15. Seat springs 14, which resiliently support a seat cushion 12, are disposed on the seat frame 15. Between the seat cushion 12 and the seat springs 14, a seat cushion lining 13 is provided for attaching the seat cushion 12. The seat cushion 12 is covered with a seat cushion covering 11. A mat 4 according to the invention is indicated by dashed lines. The mat 4 has seat heating wires and one or more antennas for child seat detection, and it is disposed between the seat cushion 12 and the seat cushion covering 11.

The way in which the antennas are arranged according to the invention is independent of the rest of the seat design. When a child seat is placed on the motor vehicle seat, the mat 4 has a slight spacing distance from the child seat. The child seat is equipped with a resonator. Due to the slight spacing distance, an extremely strong signal coupling between the antenna and resonator exists—preferably between a transmitting antenna and the resonator, but also between the resonator and a receiving antenna, if both transmitting and receiving antennas are disposed in the mat 4 in the motor vehicle seat.

The backrest 2 has approximately the same structural design as the seat part 1: A backrest frame 25 is provided, along with a backrest spring 24, a backrest lining 23, a back cushion 22, and a back cushion covering 21.

According to the invention, the mat 4 can be disposed not only in the proposed ways in a seat part of the motor vehicle seat but also and in particular in the backrest of the motor vehicle seat.

A transmitting antenna disposed in the motor vehicle seat preferably encompasses virtually the entire available area of the seat part or backrest. Two further receiving antennas are preferably also disposed in the motor vehicle seat; these receiving antennas include the area of the seat part or the backrest inside the face occupied by the transmitting antenna, in approximately equal parts. Particularly when the left-hand half of the seat part or backrest is surrounded by one receiving antenna and the right-hand half of the seat part or back rest is surrounded by the other receiving antenna, then a child seat provided with two resonators can not only be detected; even its alignment relative to the motor vehicle seat can thus be derived. The seat having the antenna is preferably the passenger seat.

FIG. 2 shows the mat 4 according to the invention in plan view. A meandering heating wire 41 for the seat heater can be seen clearly, as can a single antenna loop 40, in this case for transmitting electromagnetic signals for a child seat placed on the motor vehicle seat. Contact devices 42 for all the terminals of the mat are provided. It is understood that a plurality of seat heating wire courses and antenna conductor courses can also be disposed in such a mat. The individual heating wires and antennas can also intersect, if they are disposed in different layers of the mat and are thus electrically insulated from one another. A diagrammatic connection of the uppermost terminal 42 to an electronic control unit ECU is indicated in dashed lines.

FIG. 3 shows a section through a motor vehicle seat with a seat part 1 and a backrest 2; the seat part 1 has two components, a thigh support 18 and a base part 19. Particularly in bucket seats, the thigh support 18 is movably supported relative to the fixedly disposed base part 19 and can be extended to the front, to adapt the vehicle seat to the body size of the occupant. In a motor vehicle seat designed in this way, the antenna area of an antenna disposed only in the base part may not be large enough for coupling with a child seat placed on it. Care must accordingly be taken that the thigh support 18 also be penetrated by an antenna. The base part 19 therefore has an antenna conductor course for child seat detection that is integrated for instance with a sensor film that furthermore includes resistor elements for detecting the weight of an occupant seated on the motor vehicle seat. The antenna arrangement of the base part 19 of the motor vehicle seat can, however, also be embodied in any other way. The mat 4 of the invention is then disposed in the thigh support 18; the mat 4 is connected to the antenna 40 of the base part 19 via its contact devices 42 and a cable 5, which in the unextended state of the thigh support 18 has sufficient play, via a contact device in the base part, so that the effective antenna area for transmitting or receiving electromagnetic radiation is increased by the antenna course 40 in the seat heating mat 4 of the thigh support 18.

A child seat 43 with an identification transponder 44 is diagrammatically illustrated in dashed lines.

We claim:

1. A mat for a motor vehicle seat, comprising:
   a mat body adapted to be secured to a motor vehicle seat;
   a heating wire for a motor vehicle seat heater integrated in said mat body; and
   at least one antenna for transmitting or receiving electromagnetic signals integrated in said mat body.

2. The mat according to claim 1, wherein said antenna is adapted to cooperate with a resonator of a child seat to be placed on the motor vehicle seat.

3. The mat according to claim 1, which comprises a contact device formed on said mat body and electrically connected to said antenna, for connecting the antenna to an electric control unit.

4. The mat according to claim 1, wherein said mat body is a textile fabric mat body.

5. The mat according to claim 1, wherein said antenna is adapted to cooperate with a transponder of a child seat to be placed on the motor vehicle seat.

6. A motor vehicle seat, comprising:
   a seat part, a backrest connected to said seat part, and a mat including a mat body secured to a component selected from the group consisting of said seat part and said backrests;
   said mat body having a heating wire integrated therein for heating a component selected from the group consisting of said seat part and said backrest, and said mat body having at least one antenna integrated therein for transmitting or receiving electromagnetic signals.

7. The motor vehicle seat according to claim 6, wherein said mat is disposed in said seat part.

8. The motor vehicle seat according to claims 6, wherein said seat part and said backrest are formed with a cushion and a cushion covering, and said mat is disposed between said cushion and said cushion covering of one of said seat part and said backrest.

9. The motor vehicle seat according to claim 6, wherein said seat part and said backrest are formed with a cushion and a cushion lining, and said mat is disposed between said cushion lining and said cushion.

10. The motor vehicle seat according to claim 6, wherein said seat part has a thigh support, and said mat is disposed in said thigh support.

11. The motor vehicle seat according to claim 6, wherein said seat part includes a base part and a thigh support disposed forward of said base part, said mat is integrated in said base part and in said thigh support, and wherein said antenna in said base part and said antenna in said thigh support are electrically interconnected and form an effective antenna area for an electromagnetic coupling.

12. The motor vehicle seat according to claim 11, which comprises a contact device interconnecting said antenna of said mat and said antenna of said base part.

* * * * *